Jan. 16, 1962 C. E. McCARTY ETAL 3,017,104

ECONOMIC DISTRIBUTION COMPUTER

Filed Jan. 13, 1959 2 Sheets-Sheet 1

INVENTORS:
CLIFFORD E. McCARTY
WILLIAM D. HOLAK

BY Howson & Howson
ATTYS.

ECONOMIC DISTRIBUTION COMPUTER

Filed Jan. 13, 1959 2 Sheets-Sheet 2

| | | | | | | | |
|---|---|---|---|---|---|---|---|
| $S_1$ 160 | 8<br>50 | 8<br>60 | 8<br>50 | 8 | 8 | 8 | 8 |
| $S_2$ 50 | ∞ | ∞ | 5<br>30 | 2<br>20 | 2 | 2 | 2 |
| $S_3$ 60 | ∞ | ∞ | ∞ | 5<br>50 | 2<br>10 | 2 | 2 |
| $S_4$ 80 | ∞ | ∞ | ∞ | ∞ | 5<br>40 | 2<br>40 | 2 |
| $S_5$ 70 | ∞ | ∞ | ∞ | ∞ | ∞ | 5<br>20 | 2<br>50 |
| | 50<br>$D_1$ | 60<br>$D_2$ | 80<br>$D_3$ | 70<br>$D_4$ | 50<br>$D_5$ | 60<br>$D_6$ | 50<br>$D_7$ |

INVENTORS:
CLIFFORD E. McCARTY
WILLIAM D. HOLAK
BY Howson & Howson
ATTYS.

3,017,104

ECONOMIC DISTRIBUTION COMPUTER

Clifford E. McCarty, Ridley Park, and William D. Holak, Crum Lynne, Pa., assignors to Scott Paper Company, Chester, Pa., a corporation of Pennsylvania Filed Jan. 13, 1959, Ser. No. 786,563
14 Claims. (Cl. 235—185)

This invention relates to a simple analog computer for solving problems having to do with a change or flow in a manner which is most efficient and/or least costly where the possible changes may be expressed as unidirectional changes from one condition to another. Generally speaking, the computer is capable of solution of problems of this general sort by selection of power as the analog of the quantity to be minimized and selection of other parameters according to their relative natures, if the problem can be set up as linear simultaneous equations.

In its most general form the analog computer of the present invention consists of a network having two types of terminals which provide network nodes. The internal part of the network between the input and output terminals consists of flow paths from various input to various output terminals, but not necessarily all of the input and output terminals have connecting flow paths. Each flow path has a potential producing element, and enough of the flow paths have rectifying elements to prevent circulating currents within any of the loops internal of (and including) the input and output terminals which might otherwise be produced by potential producing elements. Thus far described, the computer is essentially like that described in the copending application of William C. Elmore and Clifford E. McCarty entitled "Analog Computer," Serial Number 786,565, filed January 13, 1959, now Patent No. 2,934,273. Flow generators under different circumstances may, or may not, be provided at each of the nodes external to the internal part of the network. Many of the problems solved by the present computer require fewer flow generators than are used for problems solved by the Elmore-McCarty computer. Unlike the corresponding flow generators or terminals of the Elmore-McCarty application, the terminals of the flow generators are selectively coupled together along at least two external paths, i.e., external of the internal network, instead of being all connected together by a common connection. At least one of these external paths is arranged to have a flow generator in order to make the device operable.

The basic computer system of the present invention, which is adapted to specific set-ups required for solution of particular problems, may be in the same form as the Elmore-McCarty computer except for external connections. Like the Elmore-McCarty computer, it is provided preferably in the form of a matrix having many input and many output nodes with flow paths of the type required between each input and each output terminal and a constant flow generator at each input and each output terminal. Each of the internal flow paths is provided with a potential producing element whose potential opposes flow and is variable, an element limiting flow in the path to one direction and a switch or valve which may open the path to prevent flow, thus effectively eliminating it from the computer setup for a particular problem. At each input and output terminal is a constant flow generator whose flow is variable so that, in effect, the flow produced can be reduced to zero, or preferably so that the generator may be shorted out of the circuit entirely. The term "variable" is used herein to include the condition in which the variable flow generators and potential producing elements may be adjusted to zero. Meters may, or may not, be included as part of the permanent circuitry in the flow paths and external connections but some means whether permanent or not must be available to measure the flows which have significant analog values. The selection of the number, type and arrangement of components used in the setup of a particular problem will depend on the nature of that problem.

The computer of the present invention is capable of solution of many types of problems. Typical of the problems it can solve are so-called "traveling salesman problem" and the so-called "caterer problem." The computer setup for each of these problems will be considered by way of example of the utility of the computer of the present invention.

In its simplest form, the "traveling salesman problem" may be stated as follows:

Where a salesman must contact customers in a group of cities what is the route he should take to minimize the distance of his tour? The problem may be stated mathematically using the following symbols:

$l_{ij}$=distance between cities where $$i=1, 2 \ldots n \text{ cities}$$
$$j=1, 2 \ldots n \text{ cities}$$

$x_{ij}$=represents the salesman's route between the $i$'th city and the $j$'th city and is a variable having either the value zero or a positive number. These values indicate no route or a route, respectively, from city $i$ to city $j$.

$\sum_j x_{ij}=C_i$=the number of times the salesman leaves the city $i$.

$\sum_i x_{ij}=A_j$=the number of times the salesman arrives at the $j$'th city.

$n$=the number of cities involved in the group to be contacted.

In addition to the above definitions, certain conditions may be imposed, and the following conditions are imposed for a single tour (one stop per city) in accordance with the statement of the problem:

$$C_i=1=\sum_j x_{ij}$$

$$A_j=1=\sum_i x_{ij}$$

Under these conditions, the objective of the problem will be satisfied if:

$$\sum_{ij} l_{ij}x_{ij}=\text{minimum}$$

Although the problem has broader scope, one simplified form of the "caterer problem" may be stated as follows:

Where a supplier has several ways involving different expense of supplying the demands of his customers, to what extent should he use each of the available ways in order to minimize his expense?

The problem has been expressed in terms of the number of spare engines required to insure a given operational level for a fleet of airplanes. It is useful in many other practical situations but it may be best understood in the terms of a caterer who has to provide linen and wishes to known to what extent he should buy new napkins, have napkins laundered in the normal time, or have napkins laundered more quickly at a higher rate. In this problem the caterer knows how many fresh napkins will be required each day and he knows the quantity of napkins which must be available from the various supplies. These and other necessary effects can be defined mathematically using the following symbols:

$D_j$=fresh napkins required on $j$th day.
$S_i$=the quantity of napkins available by direct purchase or various laundering facilities.
$p$=number of days for normal laundering at cost of $l$ cents.
$q$=number of days for speedup laundering at cost of $m$ cents.
$k$=purchase price of new napkins.
$c_{ij}$=cost per napkin on the $j$th day when supplied from the $i$th source.
$x_{ij}$=amount of napkins supplied on the $j$th day from $i$th source.
$(j+p)$=napkins used on the $j$th day ready for use again using normal laundering facilities.
$(j+q)$=napkins used on the $j$th day ready for use again speedup laundering facilities.

The objective of the problem will be satisfied where:

$$T=\sum_{ij} c_{ij}x_{ij}=\text{minimum}$$

The problems above specified lend themselves to a computer of the type described. In such a computer the cities between which travel is undertaken in the traveling salesman problem and the supply and demand points in the caterer problem are represented by the network nodes. The flow paths internal of the network are the ones which indicate the solution to the problem. The external circuit is arranged in different ways for various problems.

The present invention provides a simple computer for quickly providing a solution of the traveling salesman problem, the caterer problem, and other problems. The apparatuses we have developed are electrical networks which we have found to provide the analog of the particular problems in their equations and broadly the analog of similar problems. Although the networks described hereinafter are described in terms of electrical components, it will be recognized by those skilled in the art that the present invention may be practiced using pneumatic, mechanical or hydraulic systems or other types of electrical systems, etc.

In some types of problems a certain amount of iteration is required to arrive at a unique solution even employing the computer of the present invention. However, this iteration normally proceeds along logical lines and can be accomplished at such a rate that computation is completed quickly.

For a better understanding of the present invention, specific reference will be made only to D.C. electrical networks which are representative of the problem. It will be understood, of course, that these computers may be modified, and ordinarily will be modified, to suit the requirements of a particular problem under the particular conditions which exist and that, therefore, the computers shown are intended to be illustrative rather than limiting in nature. Referring to the accompanying drawings.

While in practical embodiments a computer in accordance with the present invention would be made with a great many input and output nodes to make it more uniformly adaptable to problems of great complexity, for the purpose of understanding the invention, matrices or array of numbers of relatively few input and output nodes will be considered in order to keep the consideration of problems as simple as possible. If these problems were to be used with a large computer employing, for example, a 40 x 40 matrix of input and output terminals, switches or valves in the flow paths other than those between the selected supply or starting points and the selected demand or destination points would be set to operate and permit flow through the paths, and the unused flow paths would have their switches or valves set effectively to remove them from the network.

Figure 1:
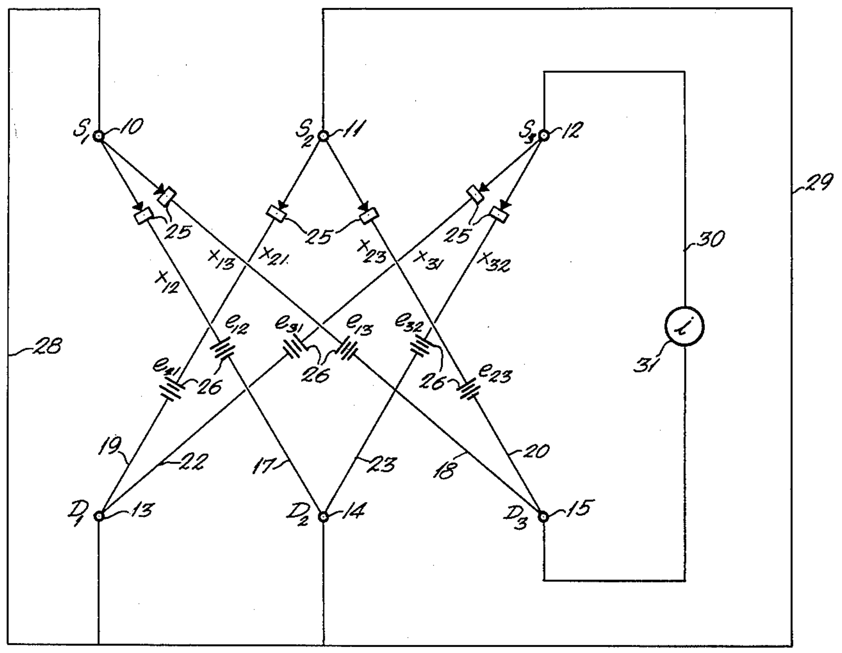
FIG. 1 is a schematic wiring diagram of a computer setup for solution of the traveling salesman problem.

Referring to FIG. 1, a simple network for solving the traveling salesman problem is shown. This network is seen to have three input terminals or nodes, 10, 11 and 12, and three output terminals or nodes, 13, 14 and 15. The problem has previously been stated and definitions given, and according to the problem there are certain number of cities which must be reached in the course of the salesman's travels. In this network the cities are represented twice, once as points of departure by nodes 10, 11 and 12, and once as points of arrival by nodes 13, 14 and 15. In the arrangement shown, nodes 10 and 13 represent the same city, nodes 11 and 14 represent the same city, and nodes 12 and 15 represent the same city. The input and output terminals representing the same city are herein called "corresponding" terminals. Thus, traveling from starting point 10 the salesman may go to destination point 14 or 15, but not to point 13 because he is already there. Simulating the routes which might be taken are flow paths 17 and 18 connecting terminal 10 with terminals 14 and 15, respectively. Similarly, terminal 11 is connected with terminal 13 by flow path 19, and terminal 11 is connected to terminal 15 by flow path 20. Terminal 11 is not connected by an internal network flow path to terminal 14, however. In similar manner terminal 12 is connected to terminal 13 by flow path 22 and to terminal 14 by flow path 23. Although in this instance each of the flow paths is shown to contain a rectifier element 25, in practice only enough rectifier elements need be employed to prevent internal circulating currents within the internal flow paths. The rectifying elements insure that flow is from the terminals simulating starting points to the terminals simulating destination points. Opposed to the flow are potentials created by batteries 26 or other potential producing means. If the object of the problem is to travel the shortest route, then the potential of the batteries is set to be proportional to the distance between the respective cities to represent the quantity $l_{ij}$ previously defined.

If in the computer used to set up and solve the problem there are internal network connections for flow paths between starting and destination points representing the same city, these flow paths must, of course, be opened to prevent error. Ordinarily switches will be provided in each flow path if the computer is an electrical type with a conductor extending from a starting point terminal to a destination point terminal. Likewise if there are current generators at the nodes of the network which are unneeded they must be shorted out, replaced by resistance, or otherwise removed from the circuit.

External of the internal network, connections are made between terminals representing the same cities such that the impedance of these connections is negligible. Thus terminal 13 is connected to terminal 10 by external flow path 28, terminal 14 is connected to terminal 11 by external flow path 29 and terminal 15 is connected to terminal 12 by external flow path 30. In one of the external flow paths, and in this case in external flow path 30, there is placed a flow generator 31 which provides the driving current to keep the network in operation. In FIG. 1, there is also shown a connection between terminal 13 and terminal 14 to provide the shortest return path.

In the traveling salesman's problem it may be necessary for iterative steps to be taken. That is, it is not always true, especially in complex situations involving many cities, that a wholly unambiguous reading may be obtained. In such instance, the iterative steps may be taken by eliminating from the computer the internal flow paths in which a return to the starting city has been executed with less than all cities being contacted. Elimination of all routes except the routes actually used will then provide an analog of the actual route to be traveled.

Figures 2, 3:
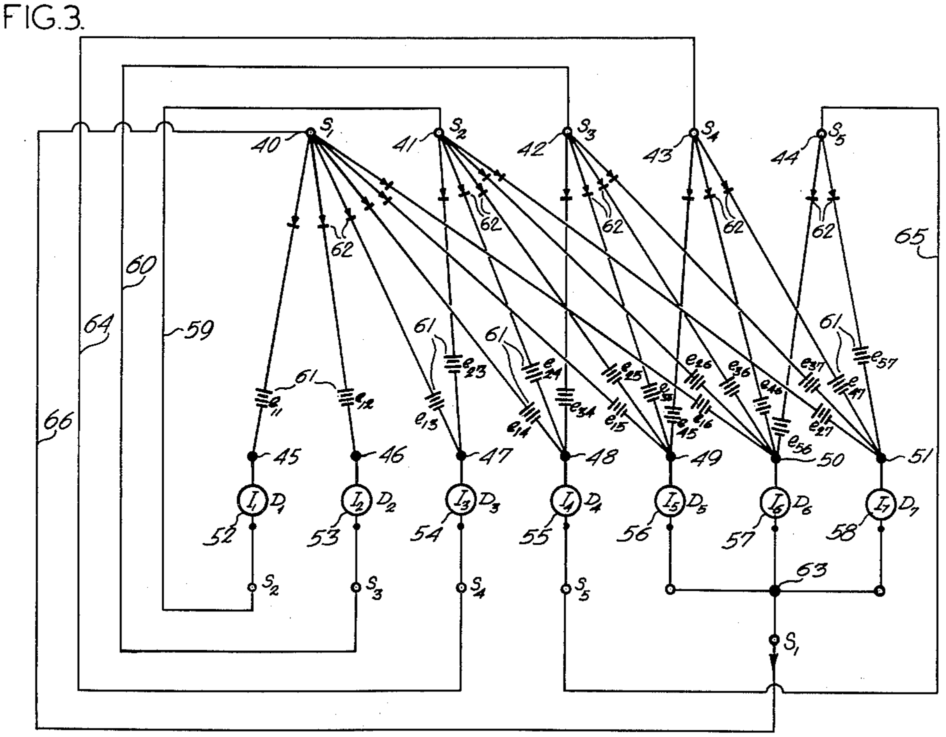
FIG. 2 is a cost matrix diagram giving illustrative specific conditions which are obtained in a specific statement of the caterer problem.
FIG. 3 is a schematic diagram of a computer setup for solution of the described caterer problem.

FIGS. 2 and 3 are directed to a specific embodiment of the caterer problem which can be solved on the same basic computer as the traveling saleman problem but with different external and internal connections. For a better understanding of the problem, a specific example is shown in the matrix of FIG. 2. There it is assumed that the caterer has specific set demands for napkins, as indicated in the boxes $D_1$, $D_2$, $D_3$, $D_4$, $D_5$, $D_6$ and $D_7$ representing the demand on each day of the week. These demands can be met potentially by three possibilities, one being the source of original purchase at eight cents, another being rapid laundry service at five cents and another being routine laundry service at two cents. The normal time for delivery of laundry is three days, speed-up laundry makes delivery possible in two days. Thus the terms previously defined by definitions are evaluated as follows:

$k$=eight cents apiece
$l$=two cents apiece
$m$=five cents apiece
$p$=three days
$q$=two days Initially, the caterer has no napkins on hand or in the laundry and hence must purchase a certain quantity at the eight cent rate.

Again, a review of the matrix of FIG. 2 will be helpful. The amounts appearing in the unlettered matrix boxes in a given row are the napkins drawn from a supply $S_i$ resulting from a particular event, i.e., original purchase or return after use, and the numbers in the boxes in a given column are those that are drawn by a particular demands. In the matrix, the small boxes indicate the cost per unit of the items demanded.

Considering the solution of the caterer problem shown in the matrix of FIG. 2, a supply $S_1$ of 160 napkins is initially purchased. Therefore, the initial supply will meet the full demands of the first two days $D_1$ and $D_2$ and part of the demand of the third day $D_3$. The balance of the demand of the third day can be met from the new supply $S_2$ of fifty napkins used and returned to the laundry the first day $D_1$, but for this supply of napkins to meet this particular need, they will have to be washed by speed-up laundry. However, the balance of the napkins returned the first day $D_1$ can be washed by regular laundry and used on $D_4$. The number available from $S_2$ from those returned $D_1$ is not sufficient to meet the demand of the fourth day $D_4$, however, so that some napkins will have to be drawn from a new supply $S_3$ created by the return of napkins on the second day $D_2$ and will have to be washed by speed-up laundry service. The balance of napkins in supply $S_3$ can be washed by regular laundry and used on the fifth day $D_5$. The same general procedure is true during the balance of the week with napkins used each day being returned to create a new supply $S_i$.

FIG. 3 shows how the computer can be set up in an analog of the caterer problem for the solution shown in FIG. 2. In this particular form there are five supply points indicated by terminals 40, 41, 42, 43 and 44. There are seven demand terminals 45, 46, 47, 48, 49, 50, and 51, indicating the demand for the different days of the week. The constant current generators 52, 53, 54, 55, 56, 57 and 58 are shown attached to the output terminals but in other embodiments of the same problem setup might be attached to the input terminals instead.

The caterer problem involves a unique feedback network in which one hundred percent feedback is used in the solution of the problem. Thus, it may be seen that napkins used one day are returned to a supply point to be re-used. This, of course, neglects loss and deterioration which can be accounted for in other ways. Thus the output terminals of the current generators are labeled with the number of an input terminal to which they are connected by feedback leads 59, 60, 64, 65 and 66.

Internal of the terminals is a network arrangement made up of flow paths which represent cost in terms of potentials opposing current flow created by demand. All of the napkins drawn from supply $S_1$ are purchased and hence the voltage in each of the lines from $S_1$ is proportional to the eight cent cost. Since supplies $S_2$, $S_3$, $S_4$ and $S_5$ come from laundered napkins reclaimed after a demand, their opposing potential will not be proportional to original cost but proportional to the cost of laundering. It is a simple matter to decide which flow paths should have applied thereto the potential representing speed-up or the potential representing regular laundry service. Those delivered on the speed-up basis are provided with a potential opposing flow proportional to the five cent value. The others are given a potential proportional to the two cent value. The same procedure is followed with the supplies $S_3$, $S_4$ and $S_5$ which all are drawn from the laundry.

It will be observed that not every supply and demand point is connected by a flow path but each flow path has some potential producing means 61 in it and preferably each flow path has a flow rectifying means limiting flow to one direction. Flow rectifying means 62 may be omitted from certain paths provided that no circulating currents result and provided that flow can be maintained in the proper direction.

In the FIG. 3 version, the circuit is completed by connecting the common terminal 63 from the output of demand generators $D_5$, $D_6$ and $D_7$ back to the common supply point $S_1$, which may be at ground or some B+ potential. It will be clear that if another week or another few days were to be involved, the circuit could be extended by adding demand points and as many supply points as were required. In the circumstances here existing, there would be added as many additional supply points as demand points.

The computer of the present invention, as previously mentioned, is capable of providing a solution to the problem whereby overall expense is minimized. Without the computer it would be necessary to make multiple solutions assuming different initial purchases and gradually approaching a condition of minimum cost. The computer avoids the necesity of doing this by providing a direct solution without interactive steps.

It will be understood that all the circumstances could be quite different and a particular unique set up is required for each situation. The starting conditions of $S_1$, for example, might be that a certain supply was available without purchasing them. In another case, laundry service might be available on a three and four day basis and at entirely different rates, which would affect which demand terminals would be connected back to which supply terminals.

In addition to the modifications possible with the specific circuits of the traveling salesman problem and the caterer problem, many additional circuit arrangements or setups are possible within the scope of the claims. All such modifications within the scope of the claims are intended to be within the scope of the invention.

We claim:

1. An analog computer comprising a network having two types of terminals, which are input and output terminals constituting network nodes, consisting of flow paths from various input to various output terminals, which flow paths constitute the internal portion of the network between the input and output terminals, each flow path having a potential producing element, flow rectifying elements in enough of the flow paths to prevent circulating currents within any loop internal of the input and output terminals which might otherwise be caused by the potential producing element, and at least two flow paths external of the internal portion of the network connecting output to input terminals in at least one of which external flow paths there is provided a flow generator.

2. The analog computer of claim 1 in which the internal flow path of the type described extends from each input to each output terminal.

3. The analog computer of claim 1 in which corresponding output terminals and input terminals are connected together by external flow paths.

4. The analog computer of claim 3 in which corresponding input and output terminals are connected together and to no other terminals by external flow paths.

5. The analog computer of claim 1 in which the output terminals are connected by external flow paths to input terminals other than those corresponding to the output terminals.

6. The analog computer of claim 5 in which no terminal of one type is connected by external flow paths to more than one terminal of the other type.

7. An analog computer comprising a network having two types of terminals, which are input and output terminals, constituting network nodes, consisting of a flow path from each input to each output terminal, which flow paths constitute the internal portion of a network between the input and output terminals, each flow path having a variable potential producing element, means for selectively interrupting flow in each internal flow path, and flow rectifying elements in enough of the flow paths to prevent circulation currents due to the potential producing elements within any loop internal of the input and output terminals, an external portion of the network between input and output terminals which consists of at least two separate flow paths from output to input terminals and a variable flow generator in at least one of such external flow paths.

8. The analog computer of claim 7 in which the flow paths are electrical flow conducting paths, the flow rectifying elements are current rectifiers, the means of interrupting the paths are electrical switches, and the flow generators are constant current generators.

9. The analog computer of claim 8 in which the potential producing elements and the flow generators produce D.C. potential and D.C. current, respectively.

10. The analog computer of claim 8 in which the potential producing elements and the flow generators produce A.C. voltage and A.C. current, respectively, arranged to be in proper phase.

11. The analog computer of claim 7 in which the flow paths are fluid conduits, the flow generators and potential producing elements are pumps, means of interrupting the flow are shut-off valves, and the flow rectifying elements are check-valves.

12. An analog computer for solution of problems of the general form of the traveling salesman problem for determining the optimum sequence of routes to cover an assigned territory most efficiently comprising input and output nodes simulating starting and destination points, flow paths of negligible resistance connecting different starting and destination points, means to limit flow in each of the flow paths to one direction such that the direction of flow is from the starting to destination points and a potential producing device in each of the flow paths, at least two external flow routes each of which is an external connection between a destination and a starting point which represent the same place, and a flow generator in at least one of said external flow routes.

13. An analog computer for solution of problems of the general form of the caterer problem for minimizing a factor involved in supplying a needed element to demand points, comprising supply and demand nodes, internal flow paths and external flow paths of negligible resistance connecting various supply and demand nodes, means to limit flow in each internal flow path to one direction such that the direction of flow through the supply and demand points does not change, and a potential producing device in each internal flow path and a flow generator in each external flow path connecting a demand point and a supply point which generator produces a flow through the external flow path from the demand point to the supply point.

14. The analog computer of claim 13 in which each supply point is connected to at least one demand point but internal flow paths are provided between less than all of the supply and demand points.

References Cited in the file of this patent

UNITED STATES PATENTS 2,934,273 Elmore et al. ------------ Apr. 26, 1960